US011272392B2

(12) United States Patent
Yu et al.

(10) Patent No.: US 11,272,392 B2
(45) Date of Patent: Mar. 8, 2022

(54) BUFFER STATUS REPORT PROCESSING METHOD AND APPARATUS

(71) Applicant: HUAWEI TECHNOLOGIES CO., LTD., Guangdong (CN)

(72) Inventors: Feng Yu, Beijing (CN); Haifeng Yu, Beijing (CN); Xin Xiong, Beijing (CN); Guangwei Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 15 days.

(21) Appl. No.: 16/369,192

(22) Filed: Mar. 29, 2019

(65) Prior Publication Data

US 2019/0230552 A1    Jul. 25, 2019

Related U.S. Application Data

(63) Continuation of application No. PCT/CN2017/103240, filed on Sep. 25, 2017.

(30) Foreign Application Priority Data

Sep. 29, 2016   (CN) .......................... 201610865223.3

(51) Int. Cl.
*H04W 28/02* (2009.01)
*H04W 72/12* (2009.01)
(Continued)

(52) U.S. Cl.
CPC ....... *H04W 28/0278* (2013.01); *H04W 24/10* (2013.01); *H04W 28/0268* (2013.01);
(Continued)

(58) Field of Classification Search
CPC combination set(s) only.
See application file for complete search history.

(56) References Cited

U.S. PATENT DOCUMENTS

2011/0292873 A1* 12/2011 Guo ........................ H04L 5/001
370/328
2012/0099452 A1*  4/2012 Dai ................... H04W 72/1221
370/252
(Continued)

FOREIGN PATENT DOCUMENTS

CN        102083206 A     6/2011
CN        102547669 A     7/2012
(Continued)

OTHER PUBLICATIONS

3GPP TS 36.321 V13.2.0 (Jun. 2016); "3rd Generation Partnership Project; Technical Specification Group Radio Access Network; Evolved Universal Terrestrial Radio Access (E-UTRA); Medium Access Control (MAC) protocol specification" (Release 13), total 91 pages.
(Continued)

*Primary Examiner* — Peter P Chau
(74) *Attorney, Agent, or Firm* — Slater Matsil, LLP

(57) ABSTRACT

A buffer status report processing method and an apparatus are disclosed. A network device determines a logical channel or a logical channel group for which a separate buffer status report BSR needs to be reported, and sends separate-BSR reporting indication information. A terminal device receives the separate-BSR reporting indication information sent by the network device, and reports the separate BSR for the logical channel or the logical channel group indicated in the separate-BSR reporting indication information. The network device receives the separate BSR reported by the terminal device, and determines, based on the separate BSR, uplink buffer data amount information corresponding to the logical channel or the logical channel group. According to the BSR processing method, resource scheduling accuracy of the network device is improved.

16 Claims, 7 Drawing Sheets

(51) Int. Cl.
*H04W 24/10* (2009.01)
*H04W 80/02* (2009.01)

(52) U.S. Cl.
CPC ... *H04W 72/1263* (2013.01); *H04W 72/1284* (2013.01); *H04W 80/02* (2013.01); *H04W 72/1289* (2013.01)

(56) References Cited

U.S. PATENT DOCUMENTS

| | | | | |
|---|---|---|---|---|
| 2012/0188956 | A1* | 7/2012 | Dong | H04W 72/1284 370/329 |
| 2015/0188680 | A1 | 7/2015 | Li et al. | |
| 2015/0230082 | A1 | 8/2015 | Li | |
| 2016/0029245 | A1* | 1/2016 | Hong | H04W 28/0278 370/329 |
| 2016/0100397 | A1* | 4/2016 | Wen | H04W 76/16 370/329 |
| 2017/0019893 | A1* | 1/2017 | Zhao | H04W 24/10 |
| 2019/0075583 | A1* | 3/2019 | Park | H04L 5/0044 |

FOREIGN PATENT DOCUMENTS

| | | |
|---|---|---|
| CN | 102595599 A | 7/2012 |
| CN | 104378825 A | 2/2015 |
| EP | 2665320 A1 | 11/2013 |
| EP | 2852208 A1 | 3/2015 |

OTHER PUBLICATIONS

Chinese Office Action dated Dec. 5, 2018 in corresponding Chinese Patent Application No. 201610865223.3 (7 pages).
International Search Report dated Dec. 28, 2017 in corresponding International Application No. PCT/CN2017/103240.
Nokia, "Buffer Reporting for E-UTRAN," 3GPP TSG-RAN WG2 Meeting #52, R2-060829, Athens, Greece, Mar. 27-31, 2006, 5 pages.

* cited by examiner

BUFFER STATUS REPORT PROCESSING METHOD AND APPARATUS

CROSS-REFERENCE TO RELATED APPLICATIONS

This application is a continuation of International Application No. PCT/CN2017/103240, filed on Sep. 25, 2017, which claims priority to Chinese Patent Application No. 201610865223.3, filed on Sep. 29, 2016. The disclosures of the aforementioned applications are hereby incorporated by reference in their entireties.

TECHNICAL FIELD

This application relates to the field of communications technologies, and in particular, to a buffer status report processing method and an apparatus.

BACKGROUND

A terminal device may be triggered to report a buffer status report (buffer status report, BSR), and report, to a base station, an amount of data that is to be sent in an uplink, so that the base station can schedule a resource for the terminal device.

Currently, when reporting a BSR, the terminal device may choose to send a BSR in a corresponding format based on a type of a BSR that the base station triggers the terminal device to report. The type of the BSR reported by the terminal device includes a padding BSR, a periodic BSR, and a regular BSR. A BSR format includes a long BSR, a short BSR, and a truncated BSR. If the BSR that the terminal device is triggered to report is a regular BSR or a period BSR, the terminal device chooses to report a long BSR when a plurality of logical channel groups include to-be-reported data, or chooses to report a short BSR when one logical channel group includes to-be-reported data. If the BSR that the terminal device is triggered to report is a padding BSR, the terminal device chooses to report a long BSR when a size of a padding resource is greater than or equal to a size of a long BSR, chooses to report a truncated BSR when a size of a padding resource is less than a size of a long BSR but greater than a size of a short BSR and a plurality of logical channel groups include to-be-reported data, or chooses to report a short BSR when one logical channel group or none of logical channel groups includes to-be-sent data.

When reporting the BSR, the terminal device reports an index regardless of which one of the foregoing three BSR formats is selected for BSR reporting, where the index indicates an amount range of data that is to be sent by the terminal device. After receiving the BSR reported by the terminal device, the base station may search a BSR table based on the index in the BSR format, to determine the amount range of the data that is to be sent by the terminal device, and further schedule a corresponding resource for the terminal device according to the amount range.

The amount range indicated in the BSR reported by the terminal device is intended for a logical channel group. However, each radio bearer corresponds to one logical channel, and when an amount range of data that is to be sent by the terminal device for each logical channel is determined, a logical channel group to which the logical channel belongs needs to be determined. As a result, processing is poorly time-efficient, and this is inapplicable to ultra-reliable and low latency communication.

SUMMARY

Embodiments of this application provide a BSR processing method and an apparatus, to improve resource scheduling accuracy of a network device, and adapt to ultra-reliable and low latency communication.

According to a first aspect, a BSR processing method is provided. In the method, a network device determines a logical channel or a logical channel group for which a separate BSR needs to be reported, and sends separate-BSR reporting indication information to a terminal device, and after receiving the separate-BSR reporting indication information, the terminal device reports the separate BSR for the logical channel or the logical channel group indicated in the separate-BSR reporting indication information.

The separate BSR is used to indicate uplink buffer data amount information corresponding to a logical channel or used to indicate uplink buffer data amount information corresponding to a logical channel group, and the separate-BSR reporting indication information is used to indicate the logical channel or the logical channel group for which the separate BSR is reported.

In this embodiment of this application, the separate BSR indicates the uplink buffer data amount information corresponding to the logical channel or the logical channel group, so that after receiving the separate BSR, the network device may determine uplink buffer data amount information that needs to be reported for a logical channel or a logical channel group corresponding to a radio bearer, and may further schedule a relatively precise resource for the terminal device for uplink data transmission, thereby improving resource scheduling accuracy of a base station.

In a possible design, the separate BSR includes an identifier of the separate BSR and a buffer size of the separate BSR. The identifier of the separate BSR is used to identify the logical channel or the logical channel group for which the separate BSR is reported. The buffer size of the separate BSR is used to indicate the uplink buffer data amount information, and the uplink buffer data amount information is uplink buffer data amount information of the terminal device for the logical channel or the logical channel group for which the separate BSR is reported.

In a possible design, the logical channel or the logical channel group for which the separate BSR is reported is identified by using the identifier of the separate BSR in one of the following manners:

A: The logical channel group for which the separate BSR is reported is identified by using a logical channel group identifier in a Medium Access Control MAC control element.

B: The logical channel for which the separate BSR is reported is identified by using a logical channel identifier in a MAC subheader.

C: The logical channel or the logical channel group for which the separate BSR is reported is identified by using a bit in the MAC subheader or the MAC control element.

In a possible design, the uplink buffer data amount information is indicated by using the buffer size of the separate BSR in the following manners:

In a first manner, an uplink buffer data amount is indicated by using a bit of a buffer size in the MAC control element, where the uplink buffer data amount indicated by using the bit of the buffer size is an integer multiple of a value represented by using the bit of the buffer size, or an integer multiple of a basic data amount indicated by the network device.

In a second manner, an uplink buffer data amount range is indicated by using a bit of a first buffer size in the MAC control element. The data amount range indicated by using the bit of the first buffer size is divided into data amount sub-ranges by using a bit of a second buffer size in the MAC control element or a bit in the MAC subheader.

In this embodiment of this application, the uplink buffer data amount information includes a data amount required for transmitting a Medium Access Control MAC protocol data unit that is constituted for the logical channel or the logical channel group.

In this embodiment of this application, for a same uplink buffer data amount, a data amount range indicated in the separate BSR that is reported by the terminal device for the logical channel or the logical channel group indicated in the separate-BSR reporting indication information is less than or equal to a data amount range indicated in a BSR that is reported by the terminal device for a logical channel or a logical channel group for which the network device sends no separate-BSR reporting indication information.

In this embodiment of this application, the uplink buffer data amount range indicated by using the bit of the first buffer size is divided into a plurality of data amount sub-ranges, and the data amount sub-ranges represent an uplink buffer data amount corresponding to the logical channel or the logical channel group, so that a data amount range can be represented relatively precisely.

According to a second aspect, a terminal device is provided. The terminal device has a function of implementing the terminal device in the design of the first aspect. The function may be implemented by hardware, or implemented by hardware executing corresponding software. The hardware or software includes one or more modules corresponding to the foregoing function. The module may be software and/or hardware.

In a possible design, the terminal device includes a receiving unit, a processing unit, and a sending unit. The receiving unit is configured to receive separate-BSR reporting indication information sent by a network device, where the separate-BSR reporting indication information is used to indicate a logical channel or a logical channel group for which a separate BSR is reported, and the separate BSR is used to indicate uplink buffer data amount information corresponding to a logical channel or used to indicate uplink buffer data amount information corresponding to a logical channel group. The processing unit is configured to determine the separate BSR based on the separate-BSR reporting indication information received by the receiving unit. The sending unit is configured to report the separate BSR for the logical channel or the logical channel group indicated in the separate-BSR reporting indication information received by the receiving unit.

The separate BSR includes an identifier of the separate BSR and a buffer size of the separate BSR. The identifier of the separate BSR is used to identify the logical channel or the logical channel group for which the separate BSR is reported. The buffer size of the separate BSR is used to indicate the uplink buffer data amount information, and the uplink buffer data amount information is uplink buffer data amount information of the terminal device for the logical channel or the logical channel group for which the separate BSR is reported.

The processing unit identifies, in one of the following manners, the logical channel or the logical channel group for which the separate BSR is reported:

identifying, by using a logical channel group identifier in a Medium Access Control MAC control element, the logical channel group for which the separate BSR is reported; identifying, by using a logical channel identifier in a MAC subheader, the logical channel for which the separate BSR is reported; and identifying, by using a bit in the MAC subheader or the MAC control element, the logical channel or the logical channel group for which the separate BSR is reported.

The processing unit indicates the uplink buffer data amount information by using the buffer size of the separate BSR in the following manners:

In a first manner, an uplink buffer data amount is indicated by using a bit of a buffer size in the MAC control element. The uplink buffer data amount indicated by using the bit of the buffer size is an integer multiple of a value represented by using the bit of the buffer size, or an integer multiple of a basic data amount indicated by the network device.

In a second manner, an uplink buffer data amount range is indicated by using a bit of a first buffer size in the MAC control element. The data amount range indicated by using the bit of the first buffer size is divided into data amount sub-ranges by using a bit of a second buffer size in the MAC control element or a bit in the MAC subheader.

The uplink buffer data amount information includes a data amount required for transmitting a Medium Access Control MAC protocol data unit that is constituted for the logical channel or the logical channel group.

For a same uplink buffer data amount, a data amount range indicated in the separate BSR that is reported by the terminal device for the logical channel or the logical channel group indicated in the separate-BSR reporting indication information is less than or equal to a data amount range indicated in a BSR that is reported by the terminal device for a logical channel or a logical channel group for which the network device sends no separate-BSR reporting indication information.

In another possible design, the receiving unit included in the terminal device may be a receiver, and the sending unit may be a transmitter. The receiver is configured to support a function of receiving, by the terminal device, the separate-BSR reporting indication information, and the transmitter is configured to support a function of transmitting, by the terminal device, the separate BSR. The terminal device further includes a processor. The processor is configured to support the terminal device in determining the separate BSR and implementing the BSR processing method in the first aspect. The terminal device may further include a memory. The memory is coupled to the processor, and stores a program instruction and data that are necessary for the terminal device.

According to a third aspect, a network device is provided. The network device has a function of implementing the network device in the design of the first aspect. The function may be implemented by hardware, or implemented by hardware executing corresponding software. The hardware or software includes one or more modules corresponding to the foregoing function. The module may be software and/or hardware.

In a possible design, the network device includes a processing unit and a sending unit. The processing unit is configured to determine a logical channel or a logical channel group for which a separate BSR needs to be reported, where the separate BSR is used to indicate uplink buffer data amount information corresponding to a logical channel or used to indicate uplink buffer data amount information corresponding to a logical channel group. The sending unit is configured to send separate-BSR reporting indication information determined by the processing unit, where the separate-BSR reporting indication information is used to indicate the logical channel or the logical channel group for which the separate BSR is reported.

The network device further includes a receiving unit. The receiving unit is configured to: after the sending unit sends the separate-BSR reporting indication information, receive the separate BSR reported by the terminal device, where the separate BSR is reported by the terminal device for the logical channel or the logical channel group indicated in the separate-BSR reporting indication information sent by the network device. The processing unit is further configured to determine, based on the separate BSR, uplink buffer data amount information corresponding to the logical channel or the logical channel group.

The processing unit may specifically determine, based on the separate BSR in the following manner, the uplink buffer data amount information corresponding to the logical channel or the logical channel group:

determining, based on an identifier of the separate BSR included in the separate BSR, the logical channel or the logical channel group corresponding to the separate BSR reported by the terminal device, and then determining, based on a buffer size of the separate BSR included in the separate BSR, the uplink buffer data amount information of the terminal device for the logical channel or the logical channel group for which the separate BSR is reported.

The processing unit may specifically determine, in the following manner based on the identifier of the separate BSR included in the separate BSR, the logical channel or the logical channel group corresponding to the separate BSR reported by the terminal device:

determining to identify, by using a logical channel group identifier in a Medium Access Control MAC control element, the logical channel group for which the separate BSR is reported; then determining to identify, by using a logical channel identifier in a MAC subheader, the logical channel for which the separate BSR is reported; and then determining to identify, by using a bit in the MAC subheader or the MAC control element, the logical channel or the logical channel group for which the separate BSR is reported.

The processing unit may specifically determine, in the following manner based on the buffer size of the separate BSR included in the separate BSR, the uplink buffer data amount information of the terminal device for the logical channel or the logical channel group for which the separate BSR is reported:

using an uplink buffer data amount indicated by using a bit of a buffer size in the MAC control element as an uplink buffer data amount of the terminal device for the logical channel or the logical channel group for which the separate BSR is reported. The uplink buffer data amount indicated by using the bit of the buffer size is an integer multiple of a value represented by using the bit of the first buffer size, or an integer multiple of a basic data amount indicated by the network device.

The processing unit may specifically determine, in the following manner based on the buffer size of the separate BSR included in the separate BSR, the uplink buffer data amount information of the terminal device for the logical channel or the logical channel group for which the separate BSR is reported:

determining an uplink buffer data amount range by using a bit of a first buffer size in the MAC control element, then determining, by using a bit of a second buffer size in the MAC control element or a bit in the MAC subheader, data amount sub-ranges that are obtained by dividing the data amount range indicated by using the bit of the first buffer size, and then using the data amount sub-ranges as an uplink buffer data amount range of the terminal device for the logical channel or the logical channel group for which the separate BSR is reported.

The uplink buffer data amount information includes a data amount required for transmitting a Medium Access Control MAC protocol data unit that is constituted for the logical channel or the logical channel group.

For a same uplink buffer data amount, a data amount range indicated in the separate BSR that is reported by the terminal device for the logical channel or the logical channel group indicated in the separate-BSR reporting indication information is less than or equal to a data amount range indicated in a BSR that is reported by the terminal device for a logical channel or a logical channel group for which the network device sends no separate-BSR reporting indication information.

In another possible design, the sending unit included in the network device may be a transmitter, and the processing unit included in the network device may be a processor. The transmitter is configured to support the network device in sending the separate-BSR reporting indication information. The processor is configured to support the network device in performing the function of the network device in the first aspect. The network device may further include a memory. The memory is coupled to the processor, and stores a program instruction and data that are necessary for the network device.

According to a fourth aspect, a communications system is provided. The communications system includes the terminal device in the second aspect and the network device in the third aspect.

In the BSR processing method, the terminal device, and the network device in the embodiments of this application, if the network device determines that a service corresponding to a radio bearer is a URLLC service, the network device may send separate-BSR reporting indication information to the terminal device, and indicate, by using the separate-BSR reporting indication information, that uplink buffer data amount information needs to be reported for a logical channel or a logical channel group corresponding to the RB. After receiving the separate-BSR reporting indication information, the terminal device reports a separate BSR for the logical channel or the logical channel group indicated in the separate-BSR reporting indication information, where the separate BSR indicates uplink buffer data amount information corresponding to a logical channel or a logical channel group, so that after receiving the separate BSR, the network device may determine the uplink buffer data amount information that needs to be reported for the logical channel or the logical channel group corresponding to the RB, and may further schedule a relatively precise resource for the terminal device for uplink data transmission, thereby improving resource scheduling accuracy of the network device.

DESCRIPTION OF EMBODIMENTS

The following describes the technical solutions of the embodiments of this application with reference to the accompanying drawings.

Figure 1:
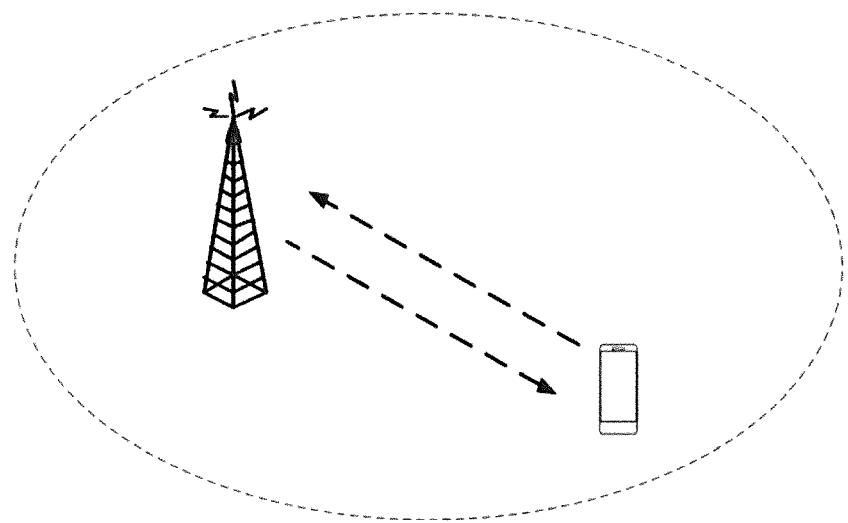
FIG. 1 is a diagram of a system architecture to which a BSR processing method is applied according to an embodiment of this application.

A BSR processing method provided in the embodiments of this application may be applied to a scheduling-based communications system, as shown in FIG. 1. In the scheduling-based communications system, a terminal device performs communication based on scheduling information sent by a network device. The scheduling-based communications system in the embodiments of this application may be Long Term Evolution (Long Term Evolution, LTE), a fifth generation (5G) communications system, or an architecture combining LTE and 5G.

Figure 2:
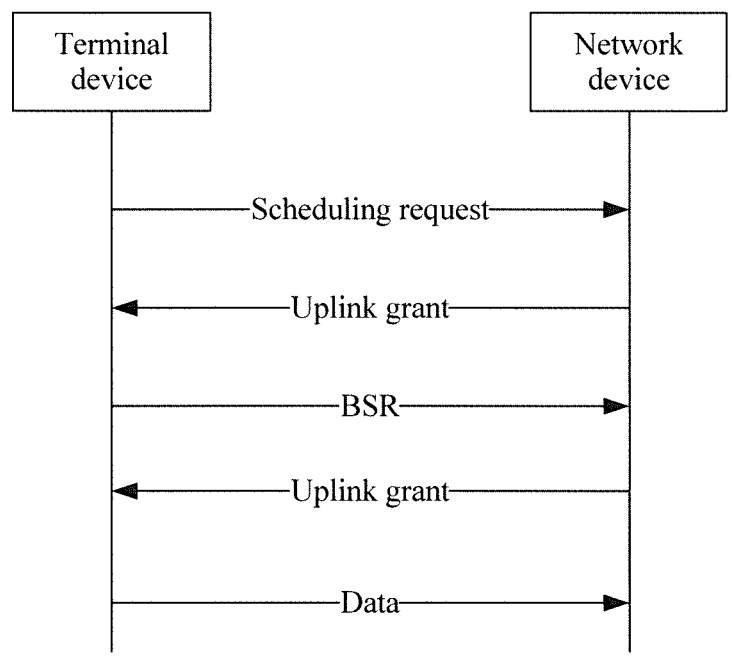
FIG. 2 is a schematic flowchart of reporting a BSR by a terminal device according to an embodiment of this application.

In the scheduling-based communications system, for a process in which the terminal device sends data to the network device, refer to FIG. 2. In FIG. 2, when needing to send data, the terminal device sends a scheduling request (scheduling request, SR) to the network device. The network device allocates an uplink grant to the terminal device based on the SR sent by the terminal device. After receiving the uplink grant, the terminal device reports a BSR to the network device, to indicate an amount of the to-be-sent data. The network device schedules an uplink resource for the terminal device and allocates an uplink grant to the terminal device based on the BSR reported by the terminal device. The terminal device sends the data based on the resource scheduled by the network device.

With development of communications technologies, ultra-reliable and low latency communication (ultra-reliable and low latency communication, URLLC) appears. The URLLC means that a relatively low latency is required from generating data to successfully sending the data. In an ultra-reliable and low latency application scenario, the network device usually schedules as many resources as possible for the terminal device for data transmission to achieve a low latency and high reliability. Therefore, in a current BSR processing method, after the terminal device reports a logical channel group-based BSR, the network device schedules a resource according to a data amount range indicated in the logical channel group-based BSR, and usually schedules a resource according to a maximum data amount indicated in the data amount range. However, currently the data amount range indicated in an index in a format of the logical channel group-based BSR is usually relatively large, and if a resource is scheduled according to the maximum data amount indicated in the data amount range, a scheduled resource may be greater than a resource required by the to-be-sent data of the terminal device, leading to a waste of the scheduled resource. If a resource is not scheduled according to the maximum data amount indicated in the data amount range, a size of a scheduled resource may be less than a size of a resource required by the to-be-sent data of the terminal device. As a result, the terminal device divides the to-be-sent data into two or even more parts for transmission, leading to an increase in a data latency. Therefore, according to a current BSR reporting manner stipulated in a protocol, resource scheduling accuracy is relatively low when a resource is scheduled according to the data amount range indicated in the index in the format of the logical channel group-based BSR.

The embodiments of this application provide a BSR processing method. In the method, if a network device determines that a service corresponding to a radio bearer (radio bearer, RB) is a URLLC service, the network device may send separate-BSR reporting indication information to a terminal device, and indicate, by using the separate-BSR reporting indication information, that uplink buffer data amount information needs to be reported for a logical channel or a logical channel group corresponding to the RB. After receiving the separate-BSR reporting indication information, the terminal device reports a separate BSR for the logical channel or the logical channel group indicated in the separate-BSR reporting indication information, where the separate BSR indicates uplink buffer data amount information corresponding to a logical channel or a logical channel group, so that after receiving the separate BSR, the network device may determine the uplink buffer data amount information that needs to be reported for the logical channel or the logical channel group corresponding to the RB, and may further schedule a relatively precise resource for the terminal device for uplink data transmission, thereby improving resource scheduling accuracy of the network device.

Figure 3:
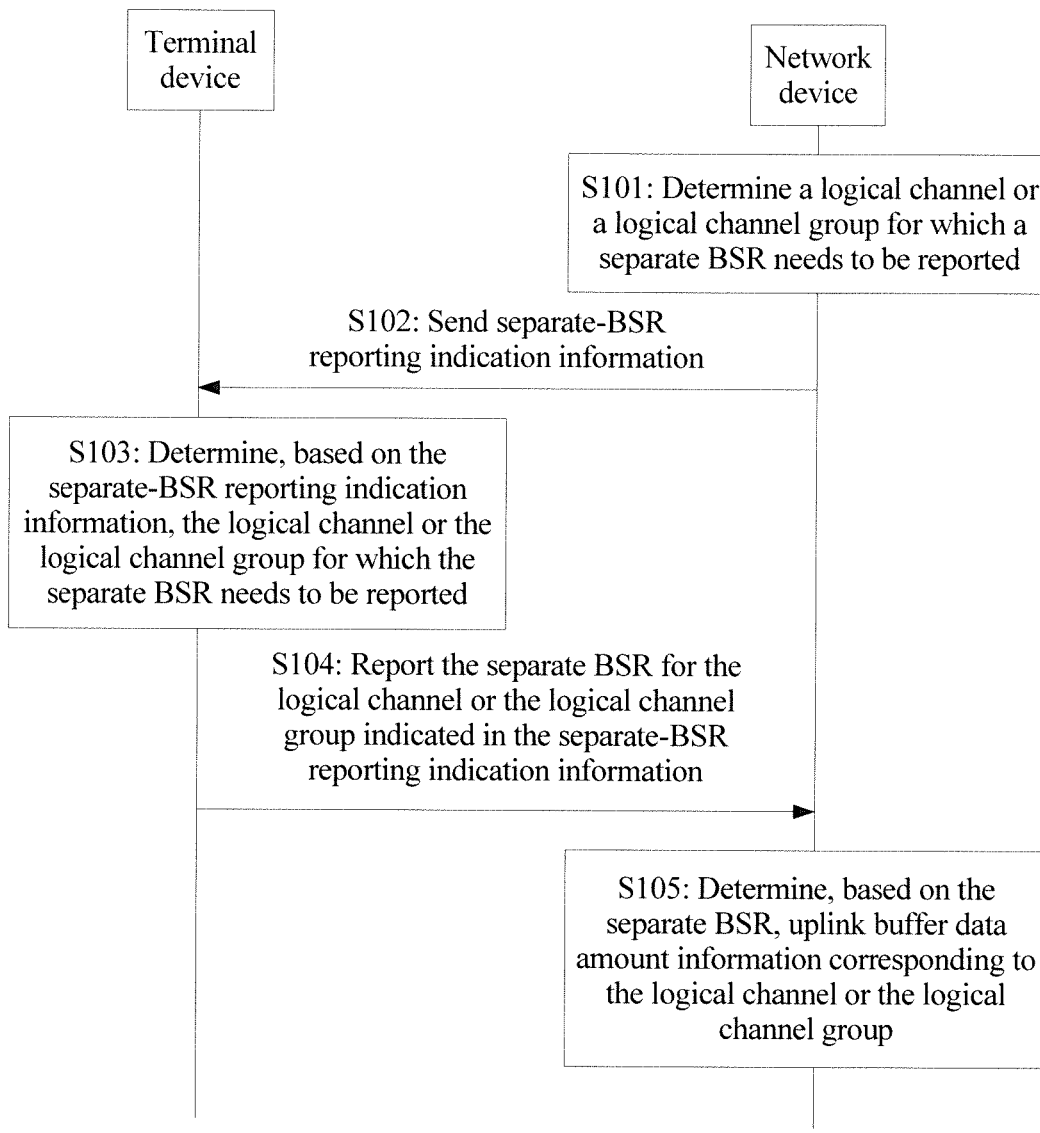
FIG. 3 is an implementation flowchart of a BSR processing method according to an embodiment of this application.

FIG. 3 is an implementation flowchart of a BSR processing method according to an embodiment of this application. As shown in FIG. 3, the method includes the following steps.

S101: A network device determines a logical channel or a logical channel group for which a separate BSR needs to be reported.

The separate BSR is used to indicate uplink buffer data amount information corresponding to a logical channel or used to indicate uplink buffer data amount information corresponding to a logical channel group.

In this embodiment of this application, for a same uplink buffer data amount, a data amount range indicated in the separate BSR that is reported by the terminal device for the logical channel or the logical channel group indicated in separate-BSR reporting indication information is less than or equal to a data amount range indicated in a BSR that is reported by the terminal device for a logical channel or a logical channel group for which the network device sends no separate-BSR reporting indication information.

Specifically, in this embodiment of this application, it may be determined, based on a communication requirement of a service carried on an RB, whether a separate BSR needs to be reported for a logical channel or a logical channel group of the service carried on the RB. For example, it may be determined, based on quality of service (quality of service, QoS) of the service carried on the RB, that the service carried on the RB is a URLLC service, and then it may be determined that the separate BSR needs to be reported for the logical channel or the logical channel group of the service.

S102: The network device sends separate-BSR reporting indication information, where the separate-BSR reporting indication information is used to indicate the logical channel or the logical channel group for which the separate BSR is reported.

S103: A terminal device receives the separate-BSR reporting indication information, and may determine, based on the separate-BSR reporting indication information, the logical channel or the logical channel group for which the separate BSR needs to be reported.

S104: The terminal device reports the separate BSR for the logical channel or the logical channel group indicated in the separate-BSR reporting indication information.

S105: The network device receives the separate BSR reported by the terminal device, and determines, based on the separate BSR, uplink buffer data amount information corresponding to the logical channel or the logical channel group.

In this embodiment of this application, after determining the logical channel or the logical channel group for which the separate BSR needs to be reported, the network device sends the separate-BSR reporting indication information to the terminal device, and indicates, by using the separate-BSR reporting indication information, the logical channel or the logical channel group for which the separate BSR needs to be reported. After receiving the separate-BSR reporting indication information, the terminal device reports the separate BSR for the logical channel or the logical channel group indicated in the separate-BSR reporting indication information, where the separate BSR indicates the uplink buffer data amount information corresponding to the logical channel or the logical channel group, so that after receiving the separate BSR, the network device may determine the uplink buffer data amount information that needs to be reported for the logical channel or the logical channel group corresponding to the RB, and may further schedule a relatively precise resource for the terminal device for uplink data transmission, thereby improving resource scheduling accuracy of a base station.

In this embodiment of this application, the following describes a specific implementation process of indicating, by using the separate BSR, the uplink buffer data amount information that needs to be reported for the logical channel or the logical channel group.

Figure 4:
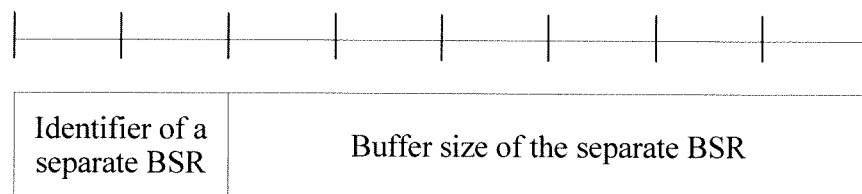
FIG. 4 is a schematic diagram of a format of a separate BSR according to an embodiment of this application.

In this embodiment of this application, a format of a separate BSR shown in FIG. 4 may be used. An identifier of the separate BSR and a buffer size of the separate BSR are set in the separate BSR. The logical channel or the logical channel group for which the separate BSR is reported is identified by using the identifier of the separate BSR, so that after receiving the separate BSR, the network device can determine, based on the identifier of the separate BSR, the logical channel or the logical channel group for which the separate BSR is reported. In this embodiment of this application, the uplink buffer data amount information is indicated by using the buffer size of the separate BSR. The uplink buffer data amount information is uplink buffer data amount information of the terminal device for the logical channel or the logical channel group for which the separate BSR is reported, so that after receiving the separate BSR, the network device can determine, based on the buffer size of the separate BSR, the uplink buffer data amount information of the terminal device for the logical channel or the logical channel group for which the separate BSR is reported.

Figure 5:
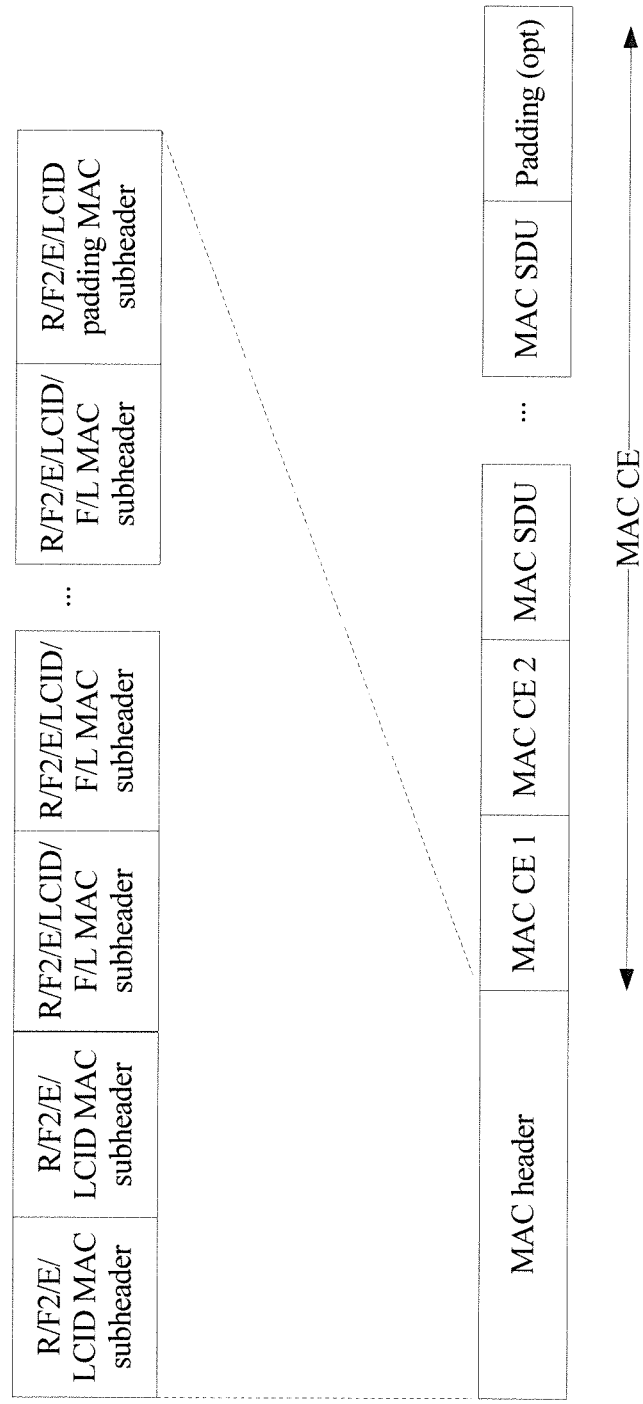
FIG. 5 is a schematic diagram of a format of a MAC PDU according to an embodiment of this application.

Specifically, a BSR message may be understood as a Medium Access Control (Medium Access Control, MAC) control element (control element, CE) of a MAC layer, and the MAC control element includes a logical channel group identifier (logical channel group id, LCG ID) and a buffer size (Buffer Size). The logical channel group identifier is used to identify a logical channel group corresponding to the BSR message. A bit of the buffer size is used to indicate a range of a reported index, and each index indicates an amount range of to-be-sent data of the terminal device. The MAC control element is sent by using a complete MAC protocol data unit (packet data unit, PDU). FIG. 5 is a schematic diagram of a format of a MAC PDU. The MAC PDU is a data packet that is finally generated at the MAC layer, is sent to a physical layer, and is sent on a channel after being processed at the physical layer. A BSR is referred to as a MAC control element. In the MAC PDU, the MAC control element or a MAC service data unit (service data unit, SDU) corresponds to a MAC subheader (subheader), and formats of MAC subheaders corresponding to different MAC control elements may be different. The MAC subheader corresponding to the BSR includes a logical channel identifier (logical channel id, LCID) used to identify a logical channel. It may be determined, by using the LCID included in the MAC subheader, that the MAC PDU is a BSR message, and a BSR type can be determined. The BSR type includes a long BSR, a short BSR, and a truncated BSR.

Figure 6:
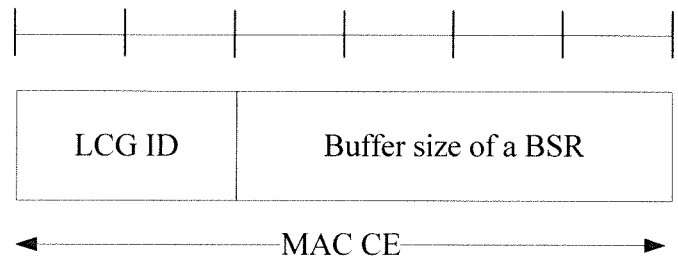
FIG. 6 is a schematic diagram of a format used to identify a logical channel group for which a separate BSR is reported according to an embodiment of this application.

In this embodiment of this application, to identify the logical channel or the logical channel group for which the separate BSR is reported, the logical channel group for which the separate BSR is reported may be identified by using the logical channel group identifier (LCG ID) in the MAC control element. The logical channel group identifier in the MAC control element may be a logical channel group identifier that is in the MAC control element and that is used to identify a logical channel group to which a conventional BSR belongs. The conventional BSR is a current logical channel group-based BSR that indicates a data amount range by using an index. A format of identifying, by using the logical channel group identifier in the MAC control element, the logical channel group for which the separate BSR is reported is shown in FIG. 6.

The terminal device sends the separate BSR by using the MAC PDU, and after receiving the separate BSR, the network device determines to identify, by using the logical channel group identifier in the MAC control element, the logical channel group for which the separate BSR is reported. Specifically, because the logical channel or the logical channel group for which the terminal device reports the separate BSR is indicated in the separate-BSR reporting indication information sent by the network device, after receiving a BSR reported by the terminal device, the network device may determine, based on a logical channel group identifier in a MAC control element, a logical channel corresponding to the BSR, and may further determine whether the BSR is a separate BSR.

Figure 7:
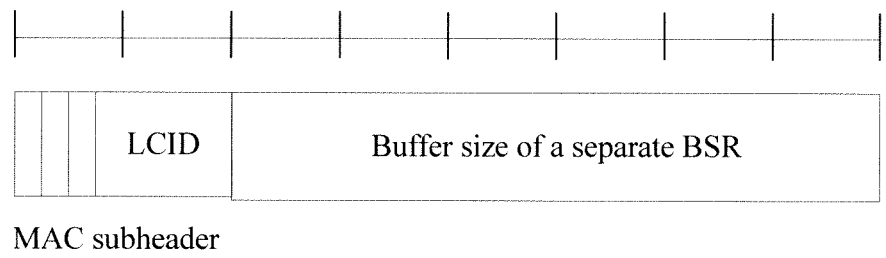
FIG. 7 is a schematic diagram of a format used to identify a logical channel for which a separate BSR is reported according to an embodiment of this application.

In this embodiment of this application, alternatively, the logical channel for which the separate BSR is reported may be identified by using the logical channel identifier in the MAC subheader, as shown in FIG. 7. The logical channel identifier in the MAC subheader may be a logical channel identifier that is newly designed in the MAC subheader, and the logical channel identifier is used to uniquely identify the logical channel for which the separate BSR is reported. The terminal device sends the separate BSR by using the MAC PDU, and after receiving the separate BSR, the network device may determine, by using the logical channel identifier that is in the MAC subheader and that is used to identify the logical channel for which the separate BSR is reported, that the received BSR is a separate BSR, and can determine the logical channel corresponding to the separate BSR.

Figure 8:
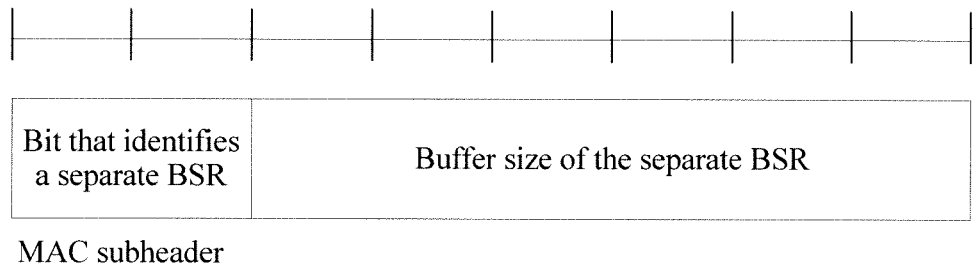
FIG. 8 is a schematic diagram of a format used to identify a logical channel or a logical channel group for which a separate BSR is reported according to an embodiment of this application.

In this embodiment of this application, alternatively, a bit used to identify the logical channel or the logical channel group for which the separate BSR is reported may be separately set in the MAC subheader, as shown in FIG. 8. The terminal device sends the separate BSR by using the MAC PDU, and after receiving the separate BSR, the network device may determine, by parsing a value of the bit that is in the MAC subheader and that is used to identify the logical channel or the logical channel group for which the separate BSR is reported, that the received BSR is a separate BSR, and can determine the logical channel or the logical channel group corresponding to the separate BSR.

In this embodiment of this application, the following describes an implementation process of indicating the uplink buffer data amount information by using the buffer size of the separate BSR.

Figure 9:
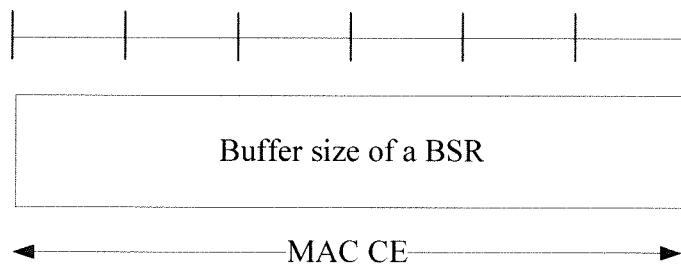
FIG. 9 is a schematic diagram of indicating an uplink buffer data amount by using a buffer size of a separate BSR according to an embodiment of this application.

In an implementation, in this embodiment of this application, an uplink buffer data amount may be indicated by using a bit of a buffer size in the MAC control element. The buffer size may be a buffer size that indicates an amount range of to-be-sent data indicated in the conventional BSR, or may be a buffer size that is newly set in the MAC control element. In this embodiment of this application, an implementation of indicating the uplink buffer data amount information by using the buffer size of the separate BSR does not limit an implementation of the identifier of the separate BSR that is used to identify the logical channel or the logical channel group for which the separate BSR is reported. In this embodiment of this application, the following separately provides descriptions by using an example in which the logical channel group for which the separate BSR is reported is identified by using the LCG ID in the conventional BSR and the logical channel for which the separate BSR is reported is identified by using the newly designed LCID. For a format of the separate BSR in which the buffer size may be the buffer size that indicates the amount range of the to-be-sent data indicated in the conventional BSR and the logical channel group for which the separate BSR is reported is identified by using the LCG ID in the conventional BSR, refer to FIG. 6. In FIG. 6, a bit that is of the buffer size in the MAC CE and that is used to indicate a range of an index in the conventional BSR may be used to indicate an uplink buffer data amount. FIG. 9 is described by using an example in which the buffer size is the buffer size that indicates the amount range of the to-be-sent data indicated in the conventional BSR, and the logical channel for which the separate BSR is reported is identified by using the newly designed LCID. In FIG. 9, because the logical channel group does not need to be identified by using the LCG ID in the MAC CE, in the MAC CE, both the bit of the buffer size used to indicate the amount range of the to-be-sent data indicated in the conventional BSR and the bit used to indicate the LCG ID can be used to indicate the uplink buffer data amount.

In this embodiment of this application, the uplink buffer data amount indicated by using the bit may be a specified specific data amount. The specific data amount may be set to, for example, an integer multiple of a value represented by using the bit of the buffer size. For example, a decimal number of a bit is directly used to indicate an uplink buffer data amount. For example, values identified by using bits are 111111=63 and 000011=3, a data amount indicated by using the bits 111111 may be an integer multiple of 63 bytes, and a data amount indicated by using the bits 000011 may be an integer multiple of 3 bytes.

In this embodiment of this application, the network device may further send a basic data amount to the terminal device, and the terminal device indicates, by using the bit of the buffer size, that the uplink buffer data amount is an integer multiple of the basic data amount indicated by the network device.

The terminal device sends the separate BSR by using the MAC PDU. After receiving the separate BSR, the network device obtains the bit of the buffer size in the MAC control element that represents the buffer size of the separate BSR, and uses the uplink buffer data amount indicated by using the bit of the buffer size in the MAC control element as the uplink buffer data amount of the terminal device for the logical channel or the logical channel group for which the separate BSR is reported.

In another implementation, in this embodiment of this application, an uplink buffer data amount range may be indicated by using a bit of a first buffer size in the MAC control element. The data amount range indicated by using the bit of the first buffer size is divided into data amount sub-ranges by using a bit of a second buffer size in the MAC control element or a bit in the MAC subheader.

In this embodiment of this application, the first buffer size may be a buffer size that represents a data amount range in the conventional BSR, and the uplink buffer data amount range is indicated by using the bit of the buffer size. For example, the data amount range may be a data amount range indicated in the index in the conventional BSR.

In this embodiment of this application, the uplink buffer data amount range indicated by using the bit of the first buffer size is divided into a plurality of data amount sub-ranges, and the data amount sub-ranges represent an uplink buffer data amount corresponding to the logical channel or the logical channel group, so that a data amount range can be represented relatively precisely.

Figure 10:
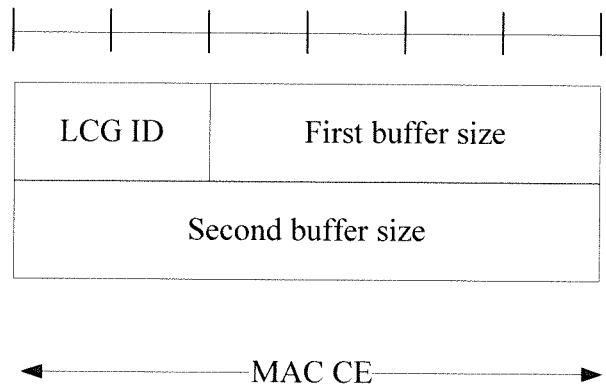
FIG. 10 is another schematic diagram of indicating an uplink buffer data amount by using a buffer size of a separate BSR according to an embodiment of this application.

In this embodiment of this application, the data amount range indicated by using the bit of the first buffer size may be divided into the data amount sub-ranges by using the bit of the second buffer size in the MAC control element. The second buffer size is a buffer size different from the first buffer size, for example, may be a buffer size that is newly added based on the buffer size used to represent the data amount range in the conventional BSR. In this embodiment of this application, an implementation of indicating the uplink buffer data amount information by using the buffer size of the separate BSR does not limit an implementation of the identifier of the separate BSR that is used to identify the logical channel or the logical channel group for which the separate BSR is reported. FIG. 10 is a schematic diagram of a format of the separate BSR that is described by using an example in which the logical channel group for which the separate BSR is reported is identified by using the LCG ID in the conventional BSR, the first buffer size is the buffer size that indicates the amount range of the to-be-sent data indicated in the conventional BSR, and the data amount range indicated by using the bit of the first buffer size is divided into the data amount sub-ranges by using the bit of the second buffer size in the MAC control element.

Figure 11:
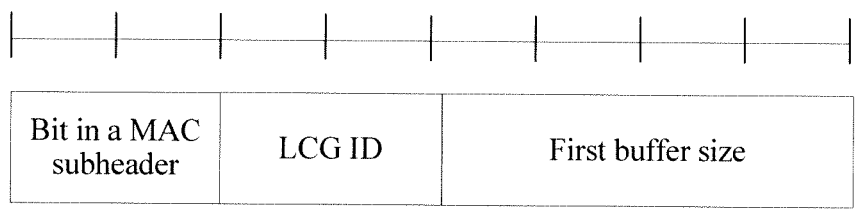
FIG. 11 is still another schematic diagram of indicating an uplink buffer data amount by using a buffer size of a separate BSR according to an embodiment of this application.

In this embodiment of this application, alternatively, the data amount range indicated by using the bit of the first buffer size may be divided into the data amount sub-ranges by using the bit in the MAC subheader. The bit in the MAC subheader may be a reserved bit in the MAC subheader that represents the conventional BSR. In this embodiment of this application, an implementation of indicating the uplink buffer data amount information by using the buffer size of the separate BSR does not limit an implementation of the identifier of the separate BSR that is used to identify the logical channel or the logical channel group for which the separate BSR is reported. FIG. 11 is a schematic diagram of a format of the separate BSR that is described by using an example in which the logical channel group for which the separate BSR is reported is identified by using the LCG ID in the conventional BSR, the first buffer size is the buffer size that indicates the amount range of the to-be-sent data indicated in the conventional BSR, and the data amount range indicated by using the bit of the first buffer size is divided into the data amount sub-ranges by using the bit in the MAC subheader.

It should be noted that in this embodiment of this application, if the data amount range indicated by using the bit of the first buffer size is divided into the data amount sub-ranges by using the bit in the MAC subheader, and the logical channel group or the logical channel for which the separate BSR is reported is identified by using the bit in the MAC subheader, the bit used to obtain the data amount sub-ranges through division is different from the bit used to represent the separate BSR.

In this embodiment of this application, a quantity of bits used to divide the data amount range into the data amount sub-ranges may be set based on an actual case. In this embodiment of this application, for a quantity of data amount sub-ranges obtained through division, division may be performed based on the quantity of bits, and the amount sub-ranges are determined by using a value of the bit. For example, descriptions are provided by using an example in which the data amount range indicated by using the bit of the first buffer size is the data amount range indicated in the index in the conventional BSR.

If 1 bit is used to obtain the data amount sub-ranges through division, the data amount range indicated in the index in the conventional BSR may be divided into the data amount sub-ranges in a manner shown in Table 1.

TABLE 1

| Bit | Data amount range | Data amount sub-range |
|---|---|---|
| 0 | Data amount range indicated in the index in the conventional BSR | First half of the data amount range indicated in the index |
| 1 | Data amount range indicated in the index in the conventional BSR | Latter half of the data range indicated in the index |

If 2 bits are used to obtain the data amount sub-ranges through division, the data amount range indicated in the index in the conventional BSR may be divided into the data amount sub-ranges in a manner shown in Table 2.

TABLE 2

| Bits | Data amount range | Data amount sub-range |
|---|---|---|
| 00 | Data amount range indicated in the index in the conventional BSR | First quarter of the data amount range indicated in the index |
| 01 | Data amount range indicated in the index in the conventional BSR | Second quarter of the data range indicated in the index |
| 10 | Data amount range indicated in the index in the conventional BSR | Third quarter of the data amount range indicated in the index |
| 11 | Data amount range indicated in the index in the conventional BSR | Last quarter of the data amount range indicated in the index |

In this embodiment of this application, the implementation of identifying the logical channel or the logical channel group for which the separate BSR is reported and the implementation of indicating the uplink buffer data amount information can be combined to obtain the separate BSR that can identify the logical channel or the logical channel group for which the separate BSR is reported and can indicate the uplink buffer data amount information. For a same uplink buffer data amount, the data amount range indicated in the separate BSR that is reported by the terminal device for the logical channel or the logical channel group indicated in the separate-BSR reporting indication information is less than or equal to the data amount range indicated in the BSR that is reported by the terminal device for the logical channel or the logical channel group for which the network device sends no separate-BSR reporting indication information. The uplink buffer data amount can be indicated relatively precisely by using the separate BSR, so that after receiving the separate BSR, the network device can schedule, based on the separate BSR, a relatively precise resource for the terminal device for data transmission.

Figure 12:
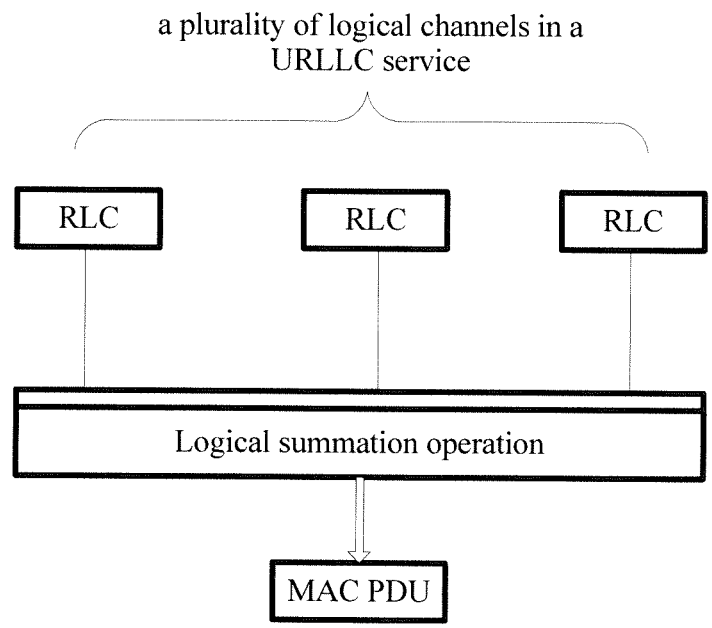
FIG. 12 is a schematic diagram of an implementation process of indicating an uplink buffer data amount according to an embodiment of this application.

Further, in this embodiment of this application, data may be transmitted between the terminal device and the network device by using a MAC PDU. It is assumed that a URLLC service includes more than one logical channel, and a MAC PDU data header and a Radio Link Control (Radio Link Control, RLC) PDU data header need to be separately set when data is transmitted on each logical channel. In this case, when the terminal device reports the separate BSR, the uplink buffer data amount information indicated in the buffer size of the separate BSR needs to include a data amount required for transmitting the MAC PDU data header and the RLC PDU data header, in other words, in this embodiment of this application, the uplink buffer data amount information indicated in the buffer size of the separate BSR includes a data amount required for transmitting a MAC PDU that is constituted for the logical channel or the logical channel group, so that during resource scheduling, the network device can accurately schedule a data transmission resource for the terminal device. An implementation process is shown in FIG. 12.

The foregoing mainly describes the solutions of the embodiments of the present invention from the perspective of interaction between the terminal device and the network device. It may be understood that to implement the foregoing functions, the terminal device and the network device each includes a corresponding hardware structure and/or software module performing the functions. Units and algorithm steps in the examples described with reference to the embodiments disclosed in this application can be implemented by hardware or a combination of hardware and computer software in the embodiments of this application.

Whether a function is performed by hardware or hardware driven by computer software depends on particular applications and design constraints of the technical solutions. For each particular application, a person skilled in the art may use different methods to implement the described function, but it should not be considered that the implementation goes beyond the scope of the technical solutions of the embodiments of this application.

In the embodiments of this application, functional units of the terminal device and the network device may be obtained through division based on the foregoing method example. For example, each functional unit may be obtained through division based on each corresponding function, or two or more functions may be integrated into one processing unit. The integrated unit may be implemented in a form of hardware, or may be implemented in a form of a software functional unit. It should be noted that unit division in the embodiments of this application is an example and is merely logical function division. During actual implementation, there may be another division manner.

Figure 13:
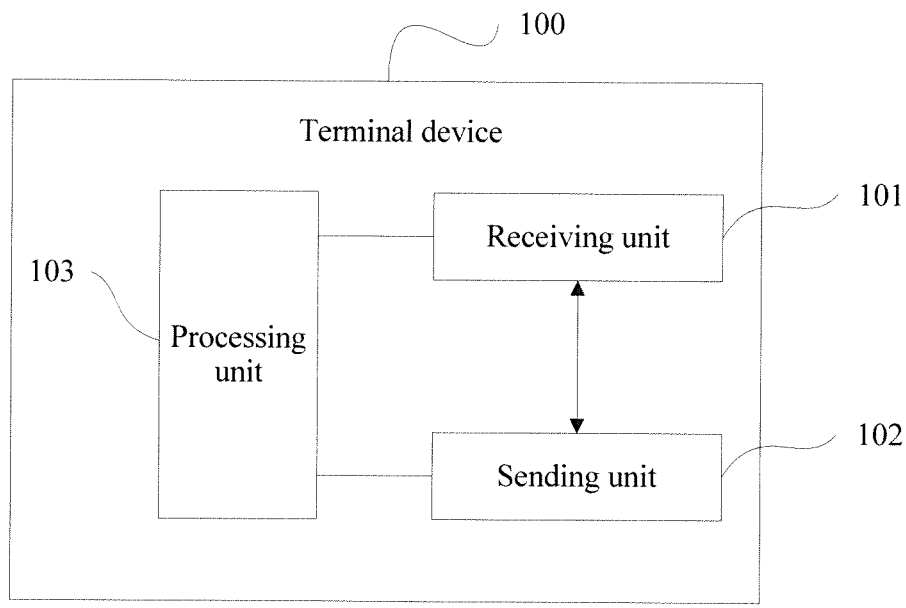
FIG. 13 is a schematic structural diagram of a terminal device according to an embodiment of this application.

When an integrated unit is used, FIG. 13 is a schematic structural diagram of a terminal device 100 according to an embodiment of this application. The terminal device includes a receiving unit 101, a sending unit 102, and a processing unit 103. The receiving unit 101 is configured to receive separate-BSR reporting indication information sent by a network device, where the separate-BSR reporting indication information is used to indicate a logical channel or a logical channel group for which a separate BSR is reported, and the separate BSR is used to indicate uplink buffer data amount information corresponding to a logical channel or used to indicate uplink buffer data amount information corresponding to a logical channel group. The processing unit 103 is configured to determine the separate BSR based on the separate-BSR reporting indication information received by the receiving unit. The sending unit 102 is configured to report the separate BSR for the logical channel or the logical channel group indicated in the separate-BSR reporting indication information received by the receiving unit 101.

The separate BSR includes an identifier of the separate BSR and a buffer size of the separate BSR. The identifier of the separate BSR is used to identify the logical channel or the logical channel group for which the separate BSR is reported. The buffer size of the separate BSR is used to indicate the uplink buffer data amount information, and the uplink buffer data amount information is uplink buffer data amount information of the terminal device for the logical channel or the logical channel group for which the separate BSR is reported.

The processing unit 103 is configured to identify, in the following manner, the logical channel or the logical channel group for which the separate BSR is reported: identifying, by using a logical channel group identifier in a Medium Access Control MAC control element, the logical channel group for which the separate BSR is reported; identifying, by using a logical channel identifier in a MAC subheader, the logical channel for which the separate BSR is reported; or identifying, by using a bit in the MAC subheader or the MAC control element, the logical channel or the logical channel group for which the separate BSR is reported.

The processing unit 103 is further configured to indicate an uplink buffer data amount by using a bit of a buffer size in the MAC control element. The uplink buffer data amount indicated by using the bit of the buffer size is an integer multiple of a value represented by using the bit of the buffer size, or an integer multiple of a basic data amount indicated by the network device.

The processing unit 103 is further configured to: indicate an uplink buffer data amount range by using a bit of a first buffer size in the MAC control element, and then divide, into data amount sub-ranges by using a bit of a second buffer size in the MAC control element or a bit in the MAC subheader, the data amount range indicated by using the bit of the first buffer size.

In this embodiment of this application, the uplink buffer data amount information includes a data amount required for transmitting a Medium Access Control MAC protocol data unit that is constituted for the logical channel or the logical channel group.

Further, in this embodiment of this application, for a same uplink buffer data amount, a data amount range indicated in the separate BSR that is reported by the terminal device for the logical channel or the logical channel group indicated in the separate-BSR reporting indication information is less than or equal to a data amount range indicated in a BSR that is reported by the terminal device for a logical channel or a logical channel group for which the network device sends no separate-BSR reporting indication information.

When a hardware form is used for implementation, in this embodiment of this application, the receiving unit 101 and the sending unit 102 may be a communications interface, a transceiver, a transceiver circuit, or the like. The communications interface is a collective name, and may include one or more interfaces. When the receiving unit 101 is a receiver, the sending unit is a transmitter, and the processing unit is a processor, the terminal device 100 in this embodiment of this application may be a terminal device shown in FIG. 14.

Figure 14:
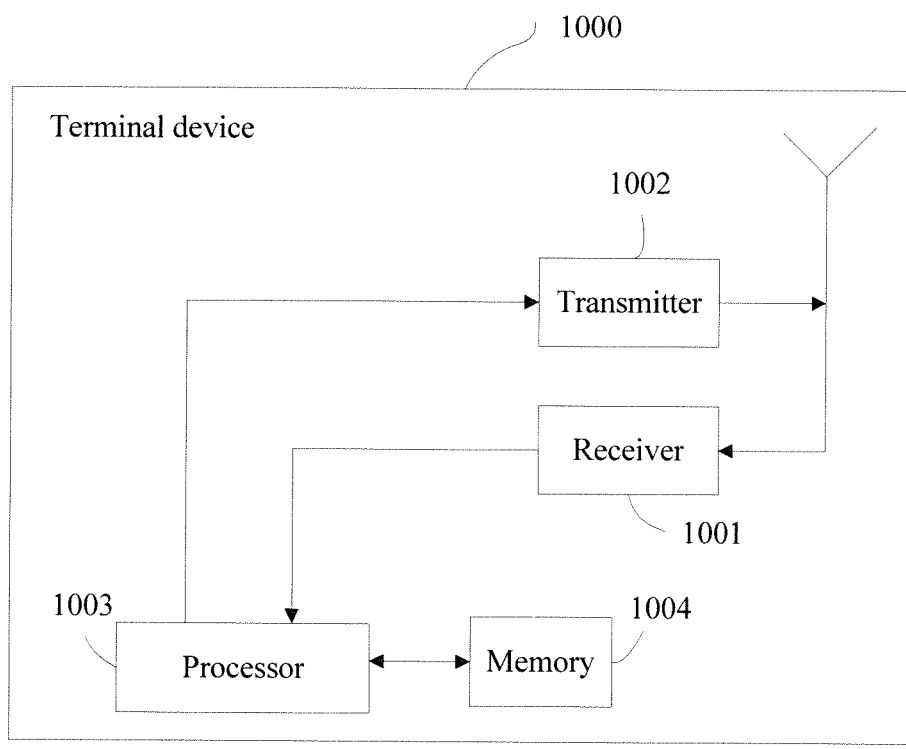
FIG. 14 is another schematic structural diagram of a terminal device according to an embodiment of this application.

FIG. 14 is a schematic structural diagram of a terminal device 1000 according to an embodiment of this application, namely, another schematic structural diagram of the terminal device in the embodiments of this application. As shown in FIG. 14, the terminal device 1000 includes a receiver 1001 and a transmitter 1002. The receiver 1001 is configured to support the terminal device in receiving separate-BSR reporting indication information. The transmitter 1002 is configured to support the terminal device in transmitting a separate BSR. The terminal device 1000 further includes a processor 1003. The processor 1003 is configured to support the terminal device in determining the separate BSR and implementing the BSR processing method in the foregoing embodiment. The terminal device 1000 may further include a memory 1004. The memory 1004 is coupled to the processor 1003, and stores a program instruction and data that are necessary for the terminal device.

In this embodiment of this application, the processor 1003 receives, by using the receiver 1001, separate-BSR reporting indication information sent by a network device, where the separate-BSR reporting indication information is used to indicate a logical channel or a logical channel group for which a separate BSR is reported, and the separate BSR is used to indicate uplink buffer data amount information corresponding to a logical channel or used to indicate uplink buffer data amount infatuation corresponding to a logical channel group. The processor 1003 determines the separate BSR based on the separate-BSR reporting indication information, and reports, by using the transmitter 1002, the separate BSR for the logical channel or the logical channel group indicated in the separate-BSR reporting indication information.

The separate BSR includes an identifier of the separate BSR and a buffer size of the separate BSR. The identifier of the separate BSR is used to identify the logical channel or the logical channel group for which the separate BSR is reported. The buffer size of the separate BSR is used to indicate the uplink buffer data amount information, and the uplink buffer data amount information is uplink buffer data amount information of the terminal device for the logical channel or the logical channel group for which the separate BSR is reported.

The processor 1003 identifies, in one of the following manners, the logical channel or the logical channel group for which the separate BSR is reported:

identifying, by using a logical channel group identifier in a Medium Access Control MAC control element, the logical channel group for which the separate BSR is reported; identifying, by using a logical channel identifier in a MAC subheader, the logical channel for which the separate BSR is reported; or identifying, by using a bit in the MAC subheader or the MAC control element, the logical channel or the logical channel group for which the separate BSR is reported.

The processor 1003 is further configured to indicate an uplink buffer data amount by using a bit of a buffer size in the MAC control element. The uplink buffer data amount indicated by using the bit of the buffer size is an integer multiple of a value represented by using the bit of the buffer size, or an integer multiple of a basic data amount indicated by the network device.

The processor 1003 is further configured to: indicate an uplink buffer data amount range by using a bit of a first buffer size in the MAC control element, and then divide, into data amount sub-ranges by using a bit of a second buffer size in the MAC control element or a bit in the MAC subheader, the data amount range indicated by using the bit of the first buffer size.

The uplink buffer data amount information includes a data amount required for transmitting a Medium Access Control MAC protocol data unit that is constituted for the logical channel or the logical channel group.

Further, in this embodiment of this application, for a same uplink buffer data amount, a data amount range indicated in the separate BSR that is reported by the terminal device for the logical channel or the logical channel group indicated in the separate-BSR reporting indication information is less than or equal to a data amount range indicated in a BSR that is reported by the terminal device for a logical channel or a logical channel group for which the network device sends no separate-BSR reporting indication information.

Figure 15:
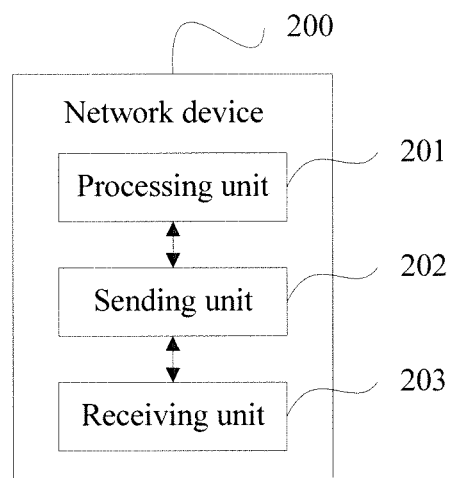
FIG. 15 is a schematic structural diagram of a network device according to an embodiment of this application.

When an integrated unit is used, FIG. 15 is a schematic structural diagram of a network device 200 according to an embodiment of this application. As shown in FIG. 15, the network device 200 includes a processing unit 201 and a sending unit 202. The processing unit 201 is configured to determine a logical channel or a logical channel group for which a separate BSR needs to be reported, where the separate BSR is used to indicate uplink buffer data amount information corresponding to a logical channel or used to indicate uplink buffer data amount information corresponding to a logical channel group. The sending unit 202 is configured to send separate-BSR reporting indication information determined by the processing unit 201, where the separate-BSR reporting indication information is used to indicate the logical channel or the logical channel group for which the separate BSR is reported.

The network device further includes a receiving unit 203. The receiving unit 203 is configured to: after the sending unit 202 sends the separate-BSR reporting indication information, receive the separate BSR reported by the terminal device, where the separate BSR is reported by the terminal device for the logical channel or the logical channel group indicated in the separate-BSR reporting indication information sent by the network device. The processing unit 201 is further configured to determine, based on the separate BSR, uplink buffer data amount information corresponding to the logical channel or the logical channel group.

The processing unit 201 determines, based on an identifier of the separate BSR included in the separate BSR, the logical channel or the logical channel group corresponding to the separate BSR reported by the terminal device, and then determines, based on a buffer size of the separate BSR included in the separate BSR, the uplink buffer data amount information of the terminal device for the logical channel or the logical channel group for which the separate BSR is reported.

The processing unit 201 determines to identify, by using a logical channel group identifier in a Medium Access Control MAC control element, the logical channel group for which the separate BSR is reported; then determines to identify, by using a logical channel identifier in a MAC subheader, the logical channel for which the separate BSR is reported; and then determines to identify, by using a bit in the MAC subheader or the MAC control element, the logical channel or the logical channel group for which the separate BSR is reported.

The processing unit 201 uses an uplink buffer data amount indicated by using a bit of a buffer size in the MAC control element as an uplink buffer data amount of the terminal device for the logical channel or the logical channel group for which the separate BSR is reported. The uplink buffer data amount indicated by using the bit of the buffer size is an integer multiple of a value represented by using the bit of the first buffer size, or an integer multiple of a basic data amount indicated by the network device.

The processing unit 201 determines an uplink buffer data amount range by using a bit of a first buffer size in the MAC control element, then determines, by using a bit of a second buffer size in the MAC control element or a bit in the MAC subheader, data amount sub-ranges that are obtained by dividing the data amount range indicated by using the bit of the first buffer size, and then uses the data amount sub-ranges as an uplink buffer data amount range of the terminal device for the logical channel or the logical channel group for which the separate BSR is reported.

The uplink buffer data amount information includes a data amount required for transmitting a Medium Access Control MAC protocol data unit that is constituted for the logical channel or the logical channel group.

Further, in this embodiment of this application, for a same uplink buffer data amount, a data amount range indicated in the separate BSR that is reported by the terminal device for the logical channel or the logical channel group indicated in the separate-BSR reporting indication information is less than or equal to a data amount range indicated in a BSR that is reported by the terminal device for a logical channel or a logical channel group for which the network device sends no separate-BSR reporting indication information.

When a hardware form is used for implementation, in this embodiment of this application, the sending unit 202 included in the network device 200 may be a transmitter, and the processing unit 201 included in the network device may be a processor.

Figure 16:
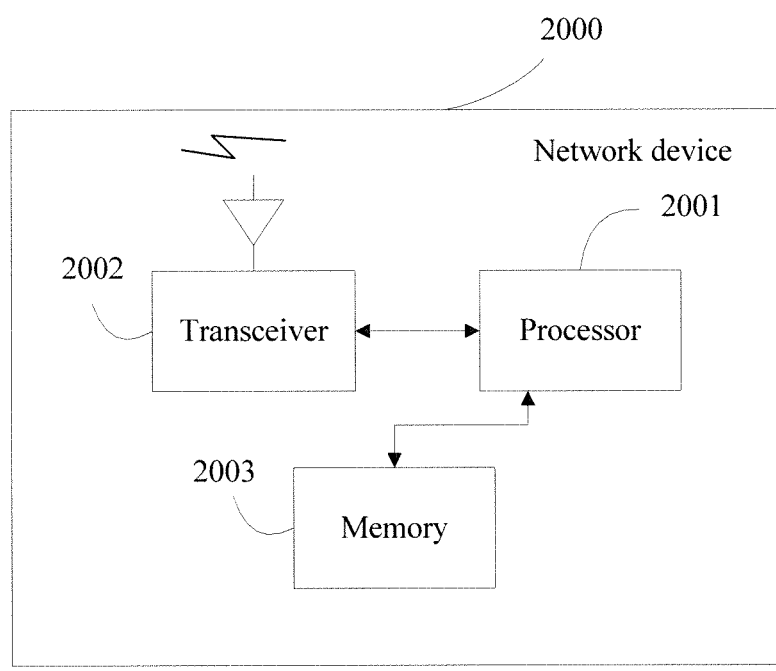
FIG. 16 is another schematic structural diagram of a network device according to an embodiment of this application.

When the processing unit 201 is a processor and the sending unit 202 is a transmitter, the network device 200 in this embodiment of this application may be a network device shown in FIG. 16.

FIG. 16 is a schematic structural diagram of a network device 2000 according to an embodiment of this application, namely, another schematic structural diagram of the network device in the embodiments of this application. As shown in FIG. 16, the network device 2000 includes a processor 2001 and a transceiver 2002. The transceiver 2002 is configured to support the network device in sending separate-BSR reporting indication information. The processor 2001 is configured to support the network device in performing the function of the network device in the BSR processing method. The network device 2000 may further include a memory 2003. The memory 2003 is coupled to the processor 2001, and stores a program instruction and data that are necessary for the network device.

In this embodiment of this application, the processor 2001 is configured to determine a logical channel or a logical channel group for which a separate BSR needs to be reported, where the separate BSR is used to indicate uplink buffer data amount information corresponding to a logical channel or used to indicate uplink buffer data amount information corresponding to a logical channel group. The transceiver 2002 is configured to send separate-BSR reporting indication information determined by the processor 2001, where the separate-BSR reporting indication information is used to indicate the logical channel or the logical channel group for which the separate BSR is reported.

The transceiver 2002 is further configured to: after sending the separate-BSR reporting indication information, receive the separate BSR reported by the terminal device, where the separate BSR is reported by the terminal device for the logical channel or the logical channel group indicated in the separate-BSR reporting indication information sent by the network device. The processor 2001 is further configured to determine, based on the separate BSR, uplink buffer data amount information corresponding to the logical channel or the logical channel group.

The processor 2001 determines, based on an identifier of the separate BSR included in the separate BSR, the logical channel or the logical channel group corresponding to the separate BSR reported by the terminal device, and then determines, based on a buffer size of the separate BSR included in the separate BSR, the uplink buffer data amount information of the terminal device for the logical channel or the logical channel group for which the separate BSR is reported.

The processor 2001 determines to identify, by using a logical channel group identifier in a Medium Access Control MAC control element, the logical channel group for which the separate BSR is reported; then determines to identify, by using a logical channel identifier in a MAC subheader, the logical channel for which the separate BSR is reported; and then determines to identify, by using a bit in the MAC subheader or the MAC control element, the logical channel or the logical channel group for which the separate BSR is reported.

The processor 2001 uses an uplink buffer data amount indicated by using a bit of a buffer size in the MAC control element as an uplink buffer data amount of the terminal device for the logical channel or the logical channel group for which the separate BSR is reported. The uplink buffer data amount indicated by using the bit of the buffer size is an integer multiple of a value represented by using the bit of the first buffer size, or an integer multiple of a basic data amount indicated by the network device.

The processor 2001 determines an uplink buffer data amount range by using a bit of a first buffer size in the MAC control element, then determines, by using a bit of a second buffer size in the MAC control element or a bit in the MAC subheader, data amount sub-ranges that are obtained by dividing the data amount range indicated by using the bit of the first buffer size, and then uses the data amount sub-ranges as an uplink buffer data amount range of the terminal device for the logical channel or the logical channel group for which the separate BSR is reported.

The uplink buffer data amount information includes a data amount required for transmitting a Medium Access Control MAC protocol data unit that is constituted for the logical channel or the logical channel group.

Further, in this embodiment of this application, for a same uplink buffer data amount, a data amount range indicated in the separate BSR that is reported by the terminal device for the logical channel or the logical channel group indicated in the separate-BSR reporting indication information is less than or equal to a data amount range indicated in a BSR that is reported by the terminal device for a logical channel or a logical channel group for which the network device sends no separate-BSR reporting indication information.

It may be understood that the accompanying drawings of the embodiments of this application show merely simplified designs of the network device and the terminal device. In an actual application, the network device and the terminal device are not limited to the foregoing structures. For example, the terminal device may further include a display device, an input/output interface, and the like. All terminal devices capable of implementing the embodiments of this application fall within the protection scope of the embodiments of this application. The network device may include any quantities of transmitters, receivers, processors, controllers, memories, communications units, and the like. All network devices capable of implementing the embodiments of this application fall within the protection scope of the embodiments of this application.

Further, it may be understood that the terminal device and the network device in the embodiments of this application may be configured to implement the corresponding functions of the terminal device and the network device in the method embodiments in the embodiments of this application. Therefore, for a part that is not described in detail in the embodiments of this application, refer to the descriptions in the method embodiments, and details are not described in the embodiments of this application again.

It should be noted that the processor or the controller in the embodiments of this application may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA), or another programmable logic device, a transistor logic device, a hardware component, or a combination thereof. The controller/processor may implement or execute various example logical blocks, modules, and circuits described with reference to content disclosed in this application. The processor may be a combination that implements a computing function, for example, includes one or.

Obviously, a person skilled in the art can make various modifications and variations to this application without departing from the spirit and scope of this application. This application is intended to cover these modifications and variations of this application provided that they fall within the scope of protection defined by the claims of this application and their equivalent technologies.

What is claimed is:

1. A method, comprising:
receiving, by a terminal device from a network device, separate buffer-status-report (BSR) reporting indication information indicating a transmission resource for which a separate BSR is to be reported, the transmission resource comprising a logical channel or a logical channel group; and
reporting, by the terminal device, the separate BSR for the transmission resource, the separate BSR indicating uplink buffer data amount information of the terminal device for the transmission resource, and the separate BSR comprising:
an identifier of the separate BSR identifying the transmission resource; and
a buffer size value of the separate BSR, the uplink buffer data amount information indicating an uplink buffer data amount corresponding to an integer multiple of the buffer size value;
wherein the reporting the separate BSR causes the network device to determine, according to the separate BSR, an uplink buffer data amount information corresponding to the transmission resource, wherein the determining the uplink buffer data amount information by the network device comprises:
determining an uplink buffer data amount range using one or more first bits of a first buffer size field in a Medium Access Control (MAC) control element (CE);
determining, using one or more second bits of a second buffer size field in the MAC CE, data amount sub-ranges by dividing the uplink buffer data amount range indicated by the one or more first bits of the first buffer size field; and
using the data amount sub-ranges as the uplink buffer data amount range of the terminal device for the transmission resource for which the separate BSR is reported.

2. The method according to claim 1, wherein the separate BSR further comprises at least one of:
the MAC CE comprising a logical channel group identifier, wherein the transmission resource is a logical channel group, and wherein the logical channel group identifier identifies the transmission resource; or
a MAC subheader comprising a logical channel identifier, wherein the transmission resource is a logical channel, and wherein the logical channel identifier identifies the transmission resource; or
a MAC protocol data unit (PDU) comprising a separate BSR identifier, the separate BSR identifier identifying the transmission resource.

3. The method according to claim 1, wherein:
the separate BSR further comprises the MAC CE comprising a buffer size field;
one or more bits of the buffer size field in the MAC CE indicate the uplink buffer data amount; and
the method further comprises allocating, by the network device, an amount of the transmission resources to the terminal device equivalent to a first integer multiple of the uplink buffer data amount represented by the one or more bits of the buffer size field or a second integer multiple of a basic data amount indicated by the network device.

4. The method according to claim 1, wherein:
the separate BSR further comprises the MAC CE comprising the first buffer size field and the second buffer size field;
the one or more first bits of the first buffer size field in the MAC CE indicate the uplink buffer data amount range; and
the uplink buffer data amount range is divided into the data amount sub-ranges using the one or more second bits of the second buffer size field in the MAC CE.

5. The method according to claim 1, wherein the uplink buffer data amount information comprises a data amount required to transmit a MAC protocol data unit (PDU) using the transmission resource.

6. The method according to claim 1, wherein for a same uplink buffer data amount, a first uplink buffer data amount range indicated in the separate BSR for the transmission resource is less than or equal to a second uplink buffer data amount range indicated in a BSR reported by the terminal device for another transmission resource for which the network device sends no separate BSR reporting indication information.

7. A method, comprising:
determining, by a network device, a transmission resource for which a separate buffer-status-report (BSR) is to be reported, the transmission resource comprising a logical channel or a logical channel group;
sending, by the network device to a terminal device, separate BSR reporting indication information indicating the transmission resource for which the separate BSR is to be reported;
receiving, by the network device from the terminal device, the separate BSR for the transmission resource, the separate BSR indicating uplink buffer data amount information of the terminal device for the transmission resource, and the separate BSR comprising:
an identifier of the separate BSR identifying the transmission resource; and
a buffer size value of the separate BSR, the uplink buffer data amount information indicating an uplink buffer data amount corresponding to an integer multiple of the buffer size value; and
determining, by the network device based on the separate BSR, the uplink buffer data amount information corresponding to the transmission resource, the determining the uplink buffer data amount comprising:
determining an uplink buffer data amount range using one or more first bits of a first buffer size field in a Medium Access Control (MAC) control element (CE);
determining, using one or more second bits of a second buffer size field in the MAC CE, data amount sub-ranges by dividing the uplink buffer data amount range indicated by the one or more first bits of the first buffer size field; and
using the data amount sub-ranges as the uplink buffer data amount range of the terminal device for the transmission resource for which the separate BSR is reported.

8. The method according to claim 7, wherein the determining the uplink buffer data amount information further comprises:
determining, by the network device based on the identifier of the separate BSR, the transmission resource corresponding to the separate BSR; and
determining, by the network device based on the buffer size value of the separate BSR, the uplink buffer data amount information of the terminal device for the transmission resource.

9. The method according to claim 8, wherein the determining the transmission resource corresponding to the separate BSR comprises at least one of:
identifying, using a logical channel group identifier in a Medium Access Control (MAC) control element (CE) comprised by the separate BSR, the logical channel group for which the separate BSR is reported, wherein the transmission resource is a logical channel group;
identifying, using a logical channel identifier in a MAC subheader comprised by the separate BSR, the logical channel for which the separate BSR is reported, wherein the transmission resource is a logical channel; or
identifying, using a separate BSR identifier, the logical channel or the logical channel group for which the separate BSR is reported.

10. The method according to claim 8, wherein the method further comprises:
using an uplink buffer data amount indicated by one or more bits of a buffer size field in a MAC CE as the uplink buffer data amount of the terminal device for the transmission resource for which the separate BSR is reported; and
allocating, by the network device, an amount of the transmission resources to the terminal device equivalent to a first integer multiple of the uplink buffer data amount indicated by the one or more bits of the buffer size field, or a second integer multiple of a basic data amount indicated by the network device.

11. A communication system comprising:
a terminal device comprising:
a first non-transitory memory storage comprising first instructions; and
a first processor in communication with the first non-transitory memory storage, wherein the first processor executes the first instructions to:
receive, from a network device, separate buffer-status-report (BSR) reporting indication information indicating a transmission resource for which a separate BSR is to be reported, wherein the transmission resource comprises a logical channel or a logical channel group;
determine, based on the separate BSR reporting indication information, the separate BSR; and
report, for the transmission resource indicated in the separate BSR reporting indication information, the separate BSR, wherein the separate BSR indicates uplink buffer data amount information of the terminal device for the transmission resource, and the separate BSR comprises:
an identifier of the separate BSR identifying the transmission resource; and
a buffer size value of the separate BSR, wherein the uplink buffer data amount information indicates an uplink buffer data amount corresponding to an integer multiple of the buffer size value; and
the network device comprising:
a second non-transitory memory storage comprising second instructions; and
a second processor in communication with the second non-transitory memory storage, wherein the second processor executes the second instructions to:
determine, according to the separate BSR, an uplink buffer data amount information corresponding to the transmission resource, wherein the second instructions to determine the uplink buffer data amount information by the network device comprise instructions to:
determine an uplink buffer data amount range using one or more first bits of a first buffer size field in a Medium Access Control (MAC) control element (CE);
determine, using one or more second bits of a second buffer size field in the MAC CE, data amount sub-ranges by dividing the uplink buffer data amount range indicated by the one or more first bits of the first buffer size field; and
use the data amount sub-ranges as the uplink buffer data amount range of the terminal device for the transmission resource for which the separate BSR is reported.

12. The communication system according to claim 11, wherein the separate BSR further comprises at least one of:
the MAC CE comprising a logical channel group identifier, wherein the transmission resource is a logical channel group, and wherein the logical channel group identifier identifies the transmission resource;
a MAC subheader comprising a logical channel identifier, wherein the transmission resource is a logical channel, and wherein the logical channel identifier identifies the transmission resource; or
a MAC protocol data unit (PDU) comprising a separate BSR identifier, the separate BSR identifier identifying the transmission resource.

13. The communication system according to claim 11, wherein:
the separate BSR further comprises a MAC CE comprising a buffer size field;
one or more bits of the buffer size field in the MAC CE indicate the uplink buffer data amount; and
the second instructions of the network device further comprise instructions to allocate an amount of transmission resources to the terminal device equivalent to a first integer multiple of the uplink buffer data amount represented by the one or more bits of the buffer size field or a second integer multiple of a basic data amount indicated by the network device.

14. The communication system according to claim 11, wherein:
the separate BSR further comprises the MAC CE comprising the first buffer size field and the second buffer size field;
the one or more first bits of the first buffer size field in the MAC CE indicate the uplink buffer data amount range; and
the uplink buffer data amount range is divided into the data amount sub-ranges using the one or more second bits of the second buffer size field in the MAC CE.

15. The communication system according to claim 11, wherein the uplink buffer data amount information of the terminal device for the transmission resource comprises a data amount required to transmit a MAC protocol data unit (PDU) using the transmission resource.

16. The communication system according to claim 11, wherein for a same uplink buffer data amount, a first uplink buffer data amount range indicated in the separate BSR for the transmission resource is less than or equal to a second uplink buffer data amount range indicated in a BSR reported by the terminal device for another transmission resource for which the network device sends no separate BSR reporting indication information.

* * * * *